United States Patent
Yamada et al.

(10) Patent No.: US 7,198,290 B2
(45) Date of Patent: Apr. 3, 2007

(54) AIR BAG FOR STEERING WHEEL

(75) Inventors: Tadashi Yamada, Aichi-ken (JP); Hitoshi Iida, Aichi-ken (JP); Naohiko Ishiguro, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 92 days.

(21) Appl. No.: 10/950,973

(22) Filed: Sep. 28, 2004

(65) Prior Publication Data

US 2005/0098992 A1    May 12, 2005

(30) Foreign Application Priority Data

Sep. 30, 2003    (JP)    ............................. 2003-341098

(51) Int. Cl.
*B60R 21/16*    (2006.01)
(52) U.S. Cl. .................... 280/731; 280/743.2
(58) Field of Classification Search ................ 280/731, 280/743.2, 729
See application file for complete search history.

(56) References Cited

U.S. PATENT DOCUMENTS

| | | | | |
|---|---|---|---|---|
| 3,727,942 A | * | 4/1973 | Arntson et al. | 280/731 |
| 3,752,501 A | * | 8/1973 | Daniel et al. | 280/729 |
| 4,966,389 A | * | 10/1990 | Takada | 280/743.2 |
| 5,186,389 A | * | 2/1993 | Shibano | 239/102.2 |
| 5,205,584 A | * | 4/1993 | Honda | 280/743.2 |
| 5,253,892 A | * | 10/1993 | Satoh | 280/731 |
| 5,358,273 A | * | 10/1994 | Onishi et al. | 280/743.1 |
| 5,558,365 A | * | 9/1996 | Oe et al. | 280/731 |
| 5,607,183 A | * | 3/1997 | Nishimura et al. | 280/743.2 |
| 5,678,858 A | * | 10/1997 | Nakayama et al. | 280/743.2 |
| 5,813,696 A | * | 9/1998 | Hill | 280/743.2 |

(Continued)

FOREIGN PATENT DOCUMENTS

JP    A-2002-012111    1/2002

(Continued)

*Primary Examiner*—Eric Culbreth
*Assistant Examiner*—Barry Gooden, Jr.
(74) *Attorney, Agent, or Firm*—Posz Law Group, PLC

(57) ABSTRACT

An air bag for steering wheel of the invention is folded and housed in a boss positioned in the vicinity of the center of a ring of a steering wheel gripped by a driver during steering. The air bag includes a driver side wall and a wheel side wall that are substantially equal in outer shape to each other. The wheel side wall includes an opening for supplying an inflation gas therethrough in the center. A periphery of the opening provides an area for attachment of the air bag to the steering wheel. A thickness regulating tether for regulating the separation distance between the driver side and wheel side walls and thus regulating the thickness of the completely inflated air bag is disposed in the vicinity of the opening. An oscillation regulating tether for regulating the separation distance between the driver side and wheel side walls is disposed in the vicinity of the ring of the steering wheel in the completely inflated air bag. The separation distance between the walls which distance is regulated by the oscillation regulating tether is such a length that the air bag can secure a cushioning action, and is shorter than the separation distance between the walls regulated by the thickness regulating tether. The air bag enables the oscillation regulation tether to restrain oscillations from occurring in the course of inflation.

10 Claims, 13 Drawing Sheets

U.S. PATENT DOCUMENTS

| | | | |
|---|---|---|---|
| 5,848,805 A * | 12/1998 | Sogi et al. | 280/743.2 |
| 5,887,894 A * | 3/1999 | Castagner et al. | 280/743.2 |
| 6,022,046 A * | 2/2000 | Isomura et al. | 280/743.2 |
| 6,059,312 A * | 5/2000 | Staub et al. | 280/729 |
| 6,086,092 A * | 7/2000 | Hill | 280/729 |
| 6,086,096 A * | 7/2000 | Link et al. | 280/743.1 |
| 6,155,595 A * | 12/2000 | Schultz | 280/729 |
| 6,170,871 B1 * | 1/2001 | Goestenkors et al. | 280/743.1 |
| 6,254,130 B1 * | 7/2001 | Jayaraman et al. | 280/743.2 |
| 6,419,267 B1 * | 7/2002 | Hashimoto et al. | 280/743.1 |
| 6,464,252 B1 * | 10/2002 | Kreuzer | 280/731 |
| 6,494,484 B2 * | 12/2002 | Bosgieter et al. | 280/743.1 |
| 6,554,316 B2 * | 4/2003 | Schneider et al. | 280/743.1 |
| 6,715,791 B2 * | 4/2004 | Keshavaraj | 280/743.2 |
| 6,733,037 B1 * | 5/2004 | Keshavaraj | 280/743.2 |
| 6,796,583 B2 * | 9/2004 | Keshavaraj | 280/743.2 |
| 6,857,659 B2 * | 2/2005 | Webber | 280/743.2 |
| 6,866,291 B2 * | 3/2005 | Abe et al. | 280/729 |
| 6,929,285 B2 * | 8/2005 | Yamada et al. | 280/743.2 |
| 6,930,065 B2 * | 8/2005 | Keshavaraj | 442/208 |
| 6,932,385 B2 * | 8/2005 | Hawthorn et al. | 280/739 |
| 6,962,363 B2 * | 11/2005 | Wang et al. | 280/729 |
| 6,981,719 B2 * | 1/2006 | Igawa | 280/743.2 |
| 2002/0084640 A1 * | 7/2002 | Bohn | 280/743.1 |
| 2003/0062712 A1 * | 4/2003 | Yamamoto et al. | 280/731 |
| 2003/0168842 A1 * | 9/2003 | Igawa | 280/743.2 |
| 2004/0026912 A1 * | 2/2004 | Yamada et al. | 280/743.2 |
| 2004/0090055 A1 * | 5/2004 | Kassman et al. | 280/743.2 |
| 2004/0207186 A1 * | 10/2004 | Kai | 280/731 |
| 2005/0062270 A1 * | 3/2005 | Kai | 280/731 |
| 2005/0127653 A1 * | 6/2005 | Williams et al. | 280/743.2 |
| 2005/0225065 A1 * | 10/2005 | Fujll | 280/743.2 |
| 2005/0236823 A1 * | 10/2005 | Schuetz | 280/743.2 |
| 2006/0131846 A1 * | 6/2006 | Abe | 280/729 |
| 2006/0163848 A1 * | 7/2006 | Abe | 280/729 |

FOREIGN PATENT DOCUMENTS

JP      2003341455 A * 12/2003

* cited by examiner

AIR BAG FOR STEERING WHEEL

The present application claims priority from Japanese Patent Application No. 2003-341098 of Yamada et al., filed on Sep. 30, 2003, the entirety of which is hereby incorporated into the present application by reference.

BACKGROUND OF THE INVENTION

1. Field of the Invention

The present invention relates to an air bag that is folded and housed in a boss positioned in the vicinity of the center of a ring of a steering wheel gripped by a driver during steering.

2. Description of the Related Art

Conventionally, an air bag for steering wheel includes a driver side wall disposed on the driver side of the completely inflated air bag and a wheel side wall disposed on the steering wheel side of the completely inflated air bag. The driver side wall and the wheel side wall are substantially equal in outer shape to each other. An opening for supplying inflation gas therethrough is disposed in the vicinity of the center of the wheel side wall. The periphery of the opening provides an area for attachment of the air bag to a steering wheel. Besides, in the vicinity of this opening is a tether for regulating a separation distance between the driver side wall and the wheel side wall of the completely inflated air bag and thus regulating the thickness of the completely inflated air bag (e.g., see JP-A-2002-012111).

However, in the conventional air bag for steering wheel, in the course of inflation, an area in the vicinity of the outer periphery sometimes oscillates in an up and down direction (an up and down direction along the axial direction of a steering shaft obtained when the steering wheel is mounted on a vehicle). When such a situation is fatal, the driver moves forward with the area of the outer periphery of the air bag separated upwardly from the ring, thus inviting a situation in which the driver directly contacts the ring. That is, variations occur in the holding performance of the air bag, so that the conventional air bag has left room for improvement in preventing the oscillations in the course of inflation.

SUMMARY OF THE INVENTION

The invention is to solve the aforesaid problem, and an object of the invention is to provide an air bag for steering wheel capable of restraining oscillations from occurring in the course of inflation.

An air bag for steering wheel according to the invention is folded and housed in a boss positioned in the vicinity of the center of a ring of a steering wheel gripped by a driver during steering. The air bag for steering wheel comprises a driver side wall that is disposed on a driver side of the completely inflated air bag and awheel side wall that is disposed on a steering wheel side of the completely inflated air bag. The driver side wall and the wheel side wall are substantially equal in outer shape to each other. The wheel side wall includes an opening for supplying an inflation gas therethrough in the vicinity of the center. A periphery of the opening provides an area for attachment of the air bag to the steering wheel. A thickness regulating tether for regulating a separation distance between the driver side wall and the wheel side wall of the completely inflated air bag and thus regulating a thickness of the completely inflated air bag is disposed in the vicinity of the opening. Moreover, an oscillation regulating tether for regulating the separation distance between the driver side wall and the wheel side wall is disposed in a steering wheel ring vicinity of the completely inflated air bag. The separation distance between the driver side wall and the wheel side wall regulated by the oscillation regulating tether is shorter than the separation distance between the driver side wall and the wheel side wall which distance is regulated by the thickness regulating tether. Needless to say, the separation distance between the driver side wall and the wheel side wall regulated by the oscillation regulating tether is set to a length capable of securing a cushioning action of the air bag.

In the air bag according to the invention, when the air bag is developed from its folded state by the inflation gas supplied thereinto, the oscillation regulating tether regulates the separation distance between the driver side wall and the wheel side wall, in the steering wheel ring vicinity of the completely inflated air bag. The regulated distance is shorter than the separation distance between the driver side wall and wheel side wall regulated by the thickness regulating tether.

That is, large oscillations in the vicinity of an outer periphery of the conventional air bag occur as an area of the air bag in the vicinity of the ring repeatedly increases and decreases in thickness. The decrease in thickness occurs as a reaction after the thickness is increased, and the increased thickness becomes on the order of the thickness of the thickest area of the completely inflated air bag or more.

However, in the present invention, in the ring vicinity area of the air bag, the separation distance between the driver side wall and the wheel side wall is regulated by the oscillation regulating tether to be shorter than the separation distance therebetween regulated by the thickness regulating tether. Consequently, up and down oscillations in the course of inflation are restrained in the ring vicinity of the air bag, so that it becomes difficult for the ring vicinity area of the air bag to separate from the ring. And, starting from the initial stage of inflation, it becomes easy for the ring vicinity of the air bag to secure a shape of the completely inflated air bag, i.e., a shape thereof that covers the ring while contacting the ring. As a result, even when the driver moves forward in the course of inflation, the air bag can prevent the driver from directly contacting the ring.

Accordingly, in the air bag for steering wheel according to the invention, the oscillations in the course of inflation can be restrained, thus stabilizing of the driver holding performance of the air bag.

Moreover, places for connection of the oscillation regulating tether to the driver side wall and the wheel side wall which are superposed one on the other and flatly developed are preferably disposed outward from the position for disposition of the ring of the steering wheel as viewed in plan when the attachment area of the opening periphery of the air bag is aligned with a position for attachment thereof in the steering wheel.

That is, upon air bag inflation, the driver side wall and the wheel side wall are inflated to separate one from the other. With the aforesaid configuration, the places for connection of the oscillation regulating tether to the driver side wall and the wheel side wall reliably come closer to the opening, i.e., to the ring than in the state where the driver side and wheel side walls are flat. Consequently, the places for connection of the oscillation regulating tether to the driver side wall and the wheel side wall are reliably disposed in the vicinity of the ring upon completion of inflation of the air bag.

Besides, the oscillation regulating tethers may be disposed in areas of the completely inflated air bag on the front and rear sides of the ring. Alternatively, the oscillation regulating tether may be arranged in only an area on the rear side.

The reason goes as follows. That is, an area of the air bag on a rear side of the ring is arranged to stably cover the ring, starting from the initial stage of inflation, by the oscillation regulating tether. As a result, the air bag can be quickly and stably disposed on the rear side of the ring which side is close to the abdomen of the driver. Conversely, an area of the air bag on a front side of the ring covers the front side of the ring in a thick state. Consequently, the air bag can protect a head of the driver with satisfactory cushioning properties. Additionally, the area of the air bag on the front side of the ring, since not having the oscillation regulating tether disposed therein, may oscillate in the initial stage of inflation. However, this front side area is an area for holding a head vicinity of the driver. Because a plane of the ring of the steering wheel is inclined from the horizontal, the front side area is separated from the driver as compared with the rear side of the air bag for holding the abdomen of the driver. That is, the front side area of the air bag can hold the head vicinity of the driver in an unoscillated condition. Consequently, even though the oscillation regulating tether is not disposed in the area of the air bag on the front side of the ring, the air bag has no difficulties in protecting the driver.

Needless to say, there may be disposed a plurality (preferably three or more) of the oscillation regulating tethers, and the individual oscillation regulating tethers may be radially arranged about the opening with even spaces between one another. In this case, the entire air bag restrains the oscillations and stably inflates, starting from the initial stage of inflation. Consequently, even when the air bag happens to inflate in the course of steering of the steering wheel, the air bag can improve the driver holding performance irrespective of the steering angle of the steering wheel.

Besides, preferably, the oscillation regulating tether is disposed securing the flow path of the inflation gas that is directed from the opening toward the rear end of the air bag as completely inflated.

With such a configuration, when the air bag inflates during straight-ahead steering, the rear end part of the airbag, i.e., an area for protecting the abdomen of the driver from the rear part of the ring can quickly inflate by allowing the inflation gas to flow thereinto. Consequently, even when the driver moves forward in the course of inflation, the air bag protects the abdomen of the driver with satisfactory cushioning properties. Such a flow path of the inflation gas can be formed by a gap between two oscillation regulating tethers disposed apart one from the other or by an opening provided in the oscillation regulating tether itself.

DESCRIPTION OF PREFERRED
EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 2:
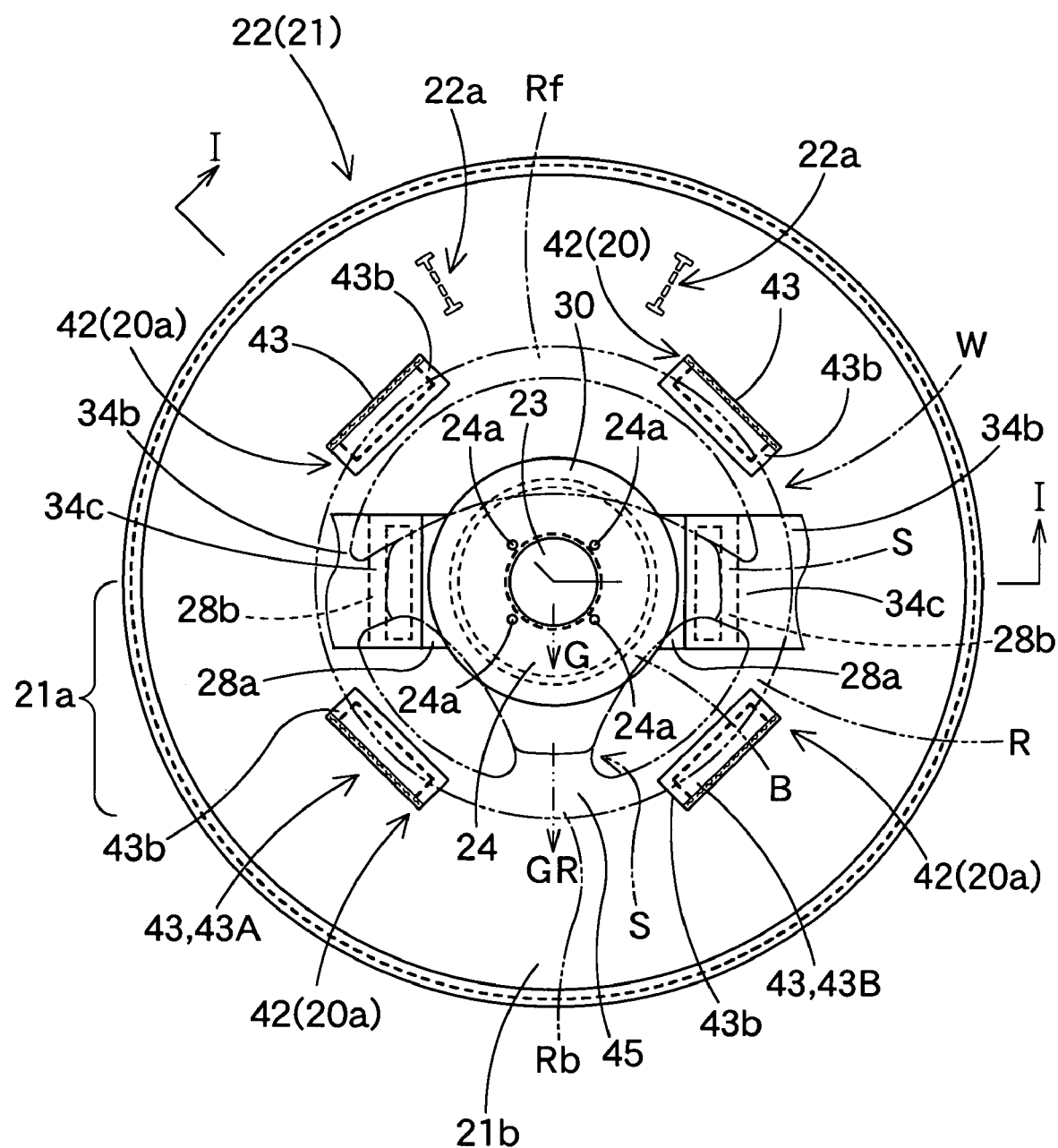
FIG. 2 is a schematic transverse sectional view of the air bag of the embodiment, which corresponds to a section taken along line II—II of FIG. 1.
Figure 6:
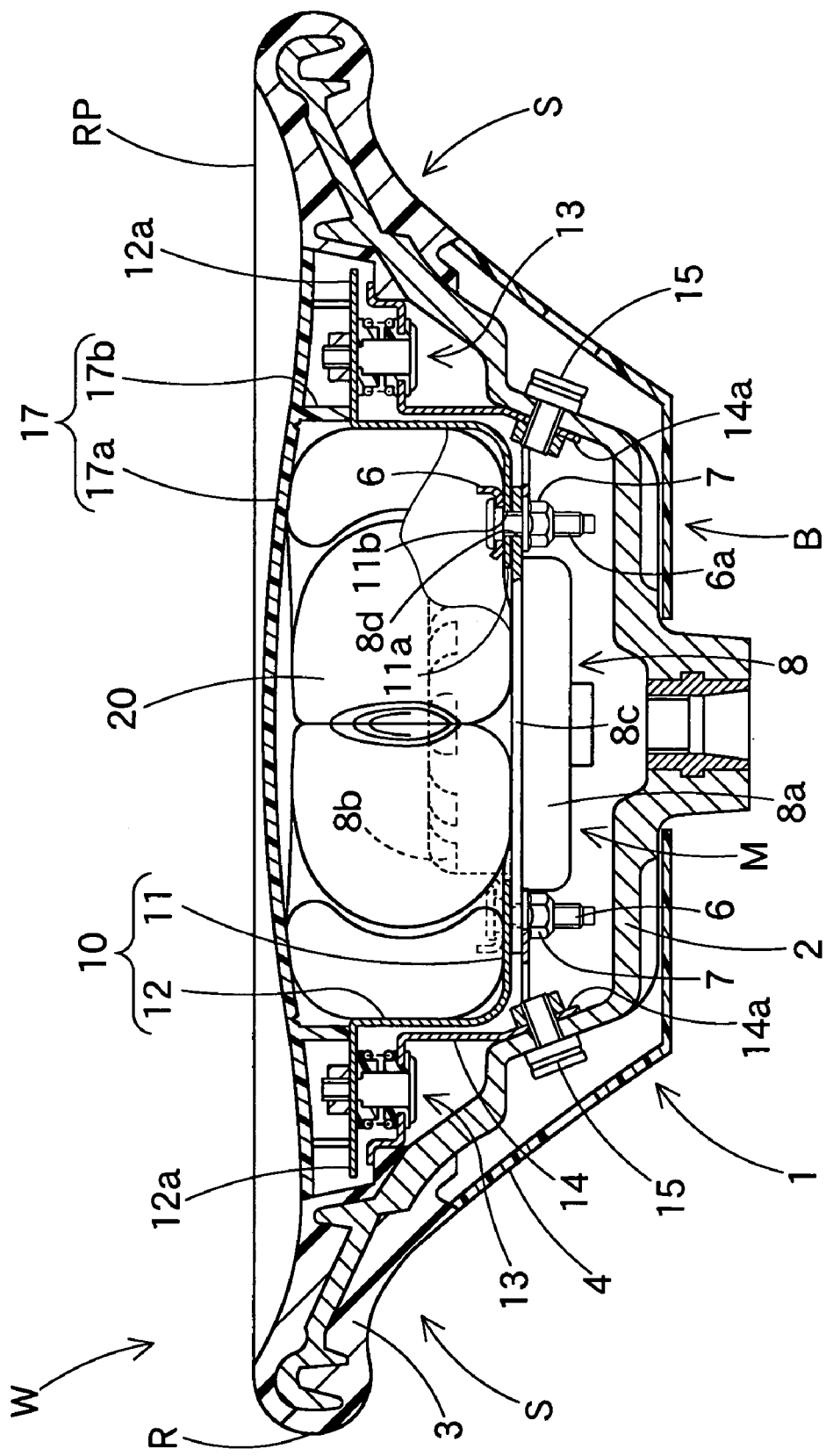
FIG. 6 is a schematic longitudinal sectional view taken along a left/right direction of an air bag device using the air bag of the embodiment.

An air bag 20 of the embodiment is used in an air bag device M for steering wheel mounted in a boss B located in the vicinity of the center of a steering wheel W, as shown by dash-double-dot line in FIG. 2 and shown in FIG. 6.

Note that front/rear, up/down, and left/right directions in the embodiment, unless otherwise stated, are based on the straight-ahead steering position of the steering wheel W mounted on a vehicle. That is, an up/down direction along the axial direction of a steering shaft SS (see FIG. 9) for assembling the steering wheel W thereto is defined as the up/down direction of the embodiment. A vehicle front/rear direction that is perpendicular to the axis of the steering shaft SS is defined as the front/rear direction of the embodiment. Moreover, a vehicle left/right direction that is perpendicular to the axis of the steering shaft SS is defined as the left/right direction of the embodiment.

As shown in FIGS. 2 and 6, the steering wheel W includes a ring R that is gripped during steering, the boss B that is disposed in the center and connected to the steering shaft SS (see FIG. 9), and three spokes S for providing a connection between the boss B and the ring R. Besides, the steering wheel W is made up of an air bag device M and a steering wheel body 1 in terms of components.

As shown in FIG. 6, the steering wheel body 1 includes a metal core 2 made from aluminum alloy or the like for connecting the ring R, the boss B, and the spokes S together, a coating layer 3 made from synthetic resin for coating the metal core 2 that corresponds to the ring R and part of the spokes S on the ring R side, and a lower cover 4 made from synthetic resin disposed below the boss B.

As shown in FIG. 6, the air bag device M includes a folded air bag 20, an inflator 8 for supplying the air bag 20 with an inflation gas, a bag holder 10 for housing and holding the air bag 20 and the inflator 8, a pad 17 for covering the folded air bag 20 from above, and an attachment bracket 14 for allowing attachment of the air bag device M to the steering wheel body 1.

The inflator 8 includes a substantially cylindrical main body 8a and a substantially square plate-like flange 8c projecting from an outer peripheral surface of the main body 8a. The main body 8a includes a plurality of gas ejection ports 8b for ejecting the inflation gas. The gas ejection ports 8b, peripherally evenly spaced in an upper portion of the main body 8a, radially eject the inflation gas supplied from the main body 8a. The flange 8c has through holes 8d for inserting therethrough bolts 6a that project from a retainer 6.

The retainer 6, made of sheet metal to form a substantially square annular body, has the downwardly projecting bolts 6a one at each of four corners. This retainer 6 holds peripheries of openings 23, 35a of the air bag 20. The bolts 6a project from the flange 8c of the inflator 8 through the peripheries of the openings 23, 35a and the bag holder 10. Nuts 7 are fastened on the bolts 6a, thereby attaching the air bag 20 to the bag holder 10 utilizing the retainer 6. Furthermore, the air bag 20 is attached to the metal core 2 of the steering wheel W utilizing the attachment bracket 14 of the air bag device M.

Additionally, the retainer 6 holds a periphery of the opening 35a of an auxiliary inflation portion 32 to a periphery of the opening 23 of the air bag body 21. The retainer 6 forms a later-described wheel side connection portion 35 of the auxiliary inflation portion 32.

The bag holder 10, made of sheet metal, has an open-topped, substantially rectangular parallelepiped shape. A bottom wall 11 of the bag holder 10 includes an insertion hole 11a for inserting therethrough the main body 8a of the inflator 8 from below and attachment holes 11b that are arranged in the periphery of the insertion hole 11a and through which are inserted the bolts 6a of the retainer 6. A side wall 12 extends upwardly from the periphery of the bottom wall 11. Outwardly extending connection seats 12a are disposed at positions for disposition of the spokes S at the upper end of the side wall 12. The connection seats 12a are connected to the attachment bracket 14 via horn switch systems 13. The attachment bracket 14, being of substantially circular annular shape, includes attachment seats 14a. The attachment seats 14a are bolted by bolts 15 to the metal core 2 corresponding to the spokes S.

The pad 17 includes a cover body 17a for covering the boss B and a side wall 17b projecting downwardly from an underside of the periphery of the cover body 17a to form a substantially square tubular shape. The cover body 17a includes two doors (whose reference numerals are omitted), which open in a front/rear direction of the steering wheel W upon inflation of the air bag 20, in an area surrounded by the side wall 17b. A thin breakable portion (whose reference numeral is omitted) that is broken when pushed by the air bag 20 to open the doors smoothly is formed in the periphery of these doors. The side wall 17b is riveted to the side wall 12 of the bag holder 10 at not-shown predetermined positions.

As shown in FIGS. 1 to 5, the air bag 20 includes an air bag body 21 configuring a bag-like outer peripheral wall that inflates with inflation gas, an auxiliary inflation portion 32 disposed within the air bag body 21, and two kinds of tethers: a thickness regulating tether 41 and an oscillation regulating tether 43 that are disposed within the air bag body 21.

The air bag body 21 includes a driver side wall 25 disposed on a driver D side of the completely inflated air bag 20 and a wheel side wall 22 disposed on the steering wheel W side of the completely inflated air bag 20. The walls 25, 22 are substantially equal in outer shape to each other. These walls 22, 25 are each formed of a woven fabric having flexibility such as polyamide or polyester and, in their flatly developed state, each has a disk-like shape of a diameter on the order of 1.5 to 2 times the outer diameter of the ring R of the steering wheel W.

A circular opening 23 for use in supplying the inflation gas is disposed in the vicinity of the center of the wheel side wall 22. A periphery 24 of the opening 23 provides an area for attachment of the air bag 20 to the steering wheel W side. The main body 8a of the inflator 8 is inserted into the opening 23 from below. The opening 23 provides an area through which the inflation gas ejected from the gas ejection ports 8b of the inflator 8 is allowed to flow into the air bag 20. Besides, four attachment holes 24a for inserting therethrough the bolts 6a formed on the retainer 6 are formed in the periphery 24 of the opening 23. Although the bag holder 10 is disposed between the opening periphery 24 of the air bag 20 and the flange 8c of the inflator 8, the bag holder 10 is omitted in FIGS. 1, 5, 7, and 8.

Figure 4:
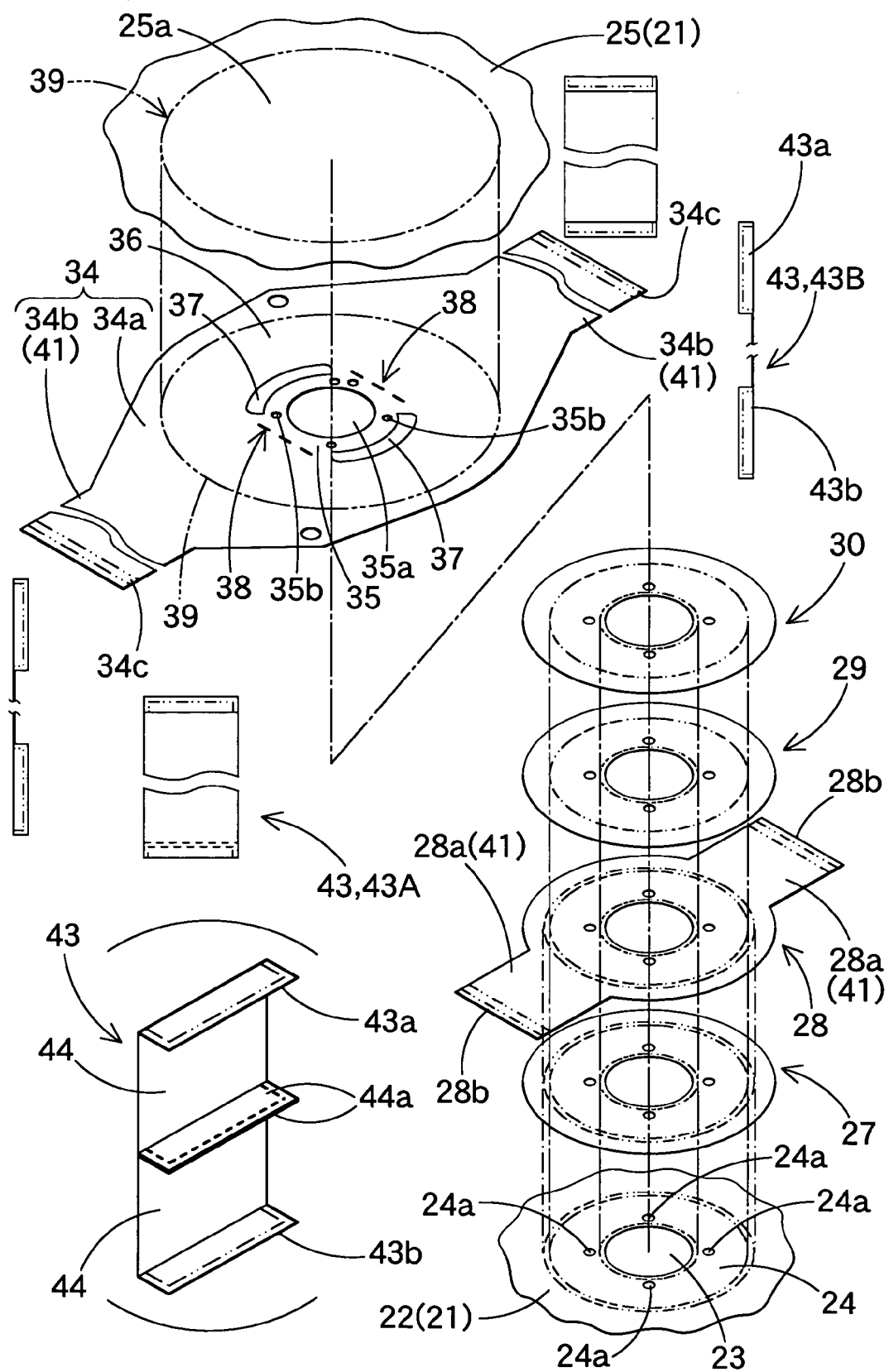
FIG. 4 is a partially exploded perspective view of the air bag of the embodiment.
Figure 5:
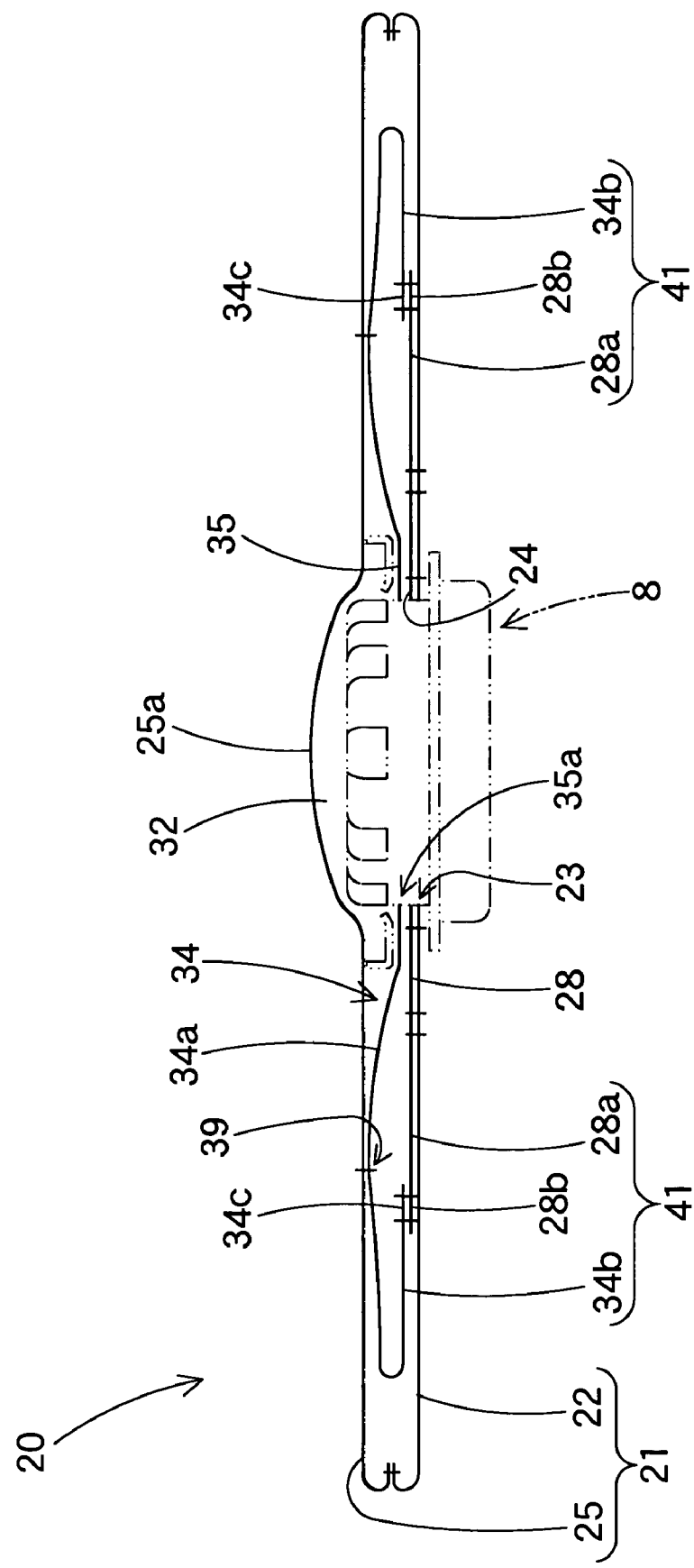
FIG. 5 is a schematic longitudinal sectional view taken along a left/right direction showing a flatly developed state of the air bag of the embodiment.

Besides, as best shown in FIG. 4, four substantially circular reinforcing fabrics 27, 28, 29, 30 made of a woven fabric similar to that of the walls 22, 25 are sewn to the opening periphery 24. The reinforcing fabrics 27, 28, 29, 30 are each provided with the opening 23 and the attachment holes 24a.

Furthermore, the wheel side wall 22 is provided with vent holes 22a through which a surplus inflation gas can be discharged, as shown in FIG. 2. In the illustrated embodiment, each of the vent holes 22a is formed of a plurality of slits to have a I shape. When the gas is discharged, each of the vent holes 22a is broken between the slits to form a substantially rectangular opening.

The air bag body 21 is internally provided in two locations close to the opening 23 with thickness regulating tethers 41 that regulate a separation distance between the driver side wall 25 and the wheel side wall 22 of the completely inflated air bag 20 and thus regulate a thickness of the completely inflated air bag 20. These thickness regulating tethers 41 are formed by connecting leading end portions 28b, 34c together. The leading end portion 28b is formed at the leading end of an extension portion 28a extending outwardly from each of left and right edges of the reinforcing fabric 28. The leading end portion 34c is formed at a leading end of a belt-like portion 34b of an inflation portion fabric material 34.

The inflation portion fabric material 34 serves to form the auxiliary inflation portion 32 for securing the thickness of the central area of the air bag 20 in the initial state of inflation of the air bag 20. The fabric material 34 includes a substantially disk-like flat plate portion 34a having a larger outer shape than the reinforcing fabrics 27, etc., and the belt-like portions 34b extending outwardly from both left and right sides of the flat plate portion 34a. An opening 35a through which the main body 8a of the inflator 8 can be inserted from below is formed in the center of the flat plate portion 34a. Attachment holes 35b through which the bolts 6a of the retainer 6 can be inserted are formed in the periphery of the opening 35a. This periphery of the opening 35a is connected to the wheel side wall 22 to provide a wheel side connection portion 35 by being held by the retainer 6. Besides, the flat plate portion 34a is sewn, in the vicinity of its outer edge, to a center of the driver side wall 25 to provide a driver side connection portion 39.

Figure 7:
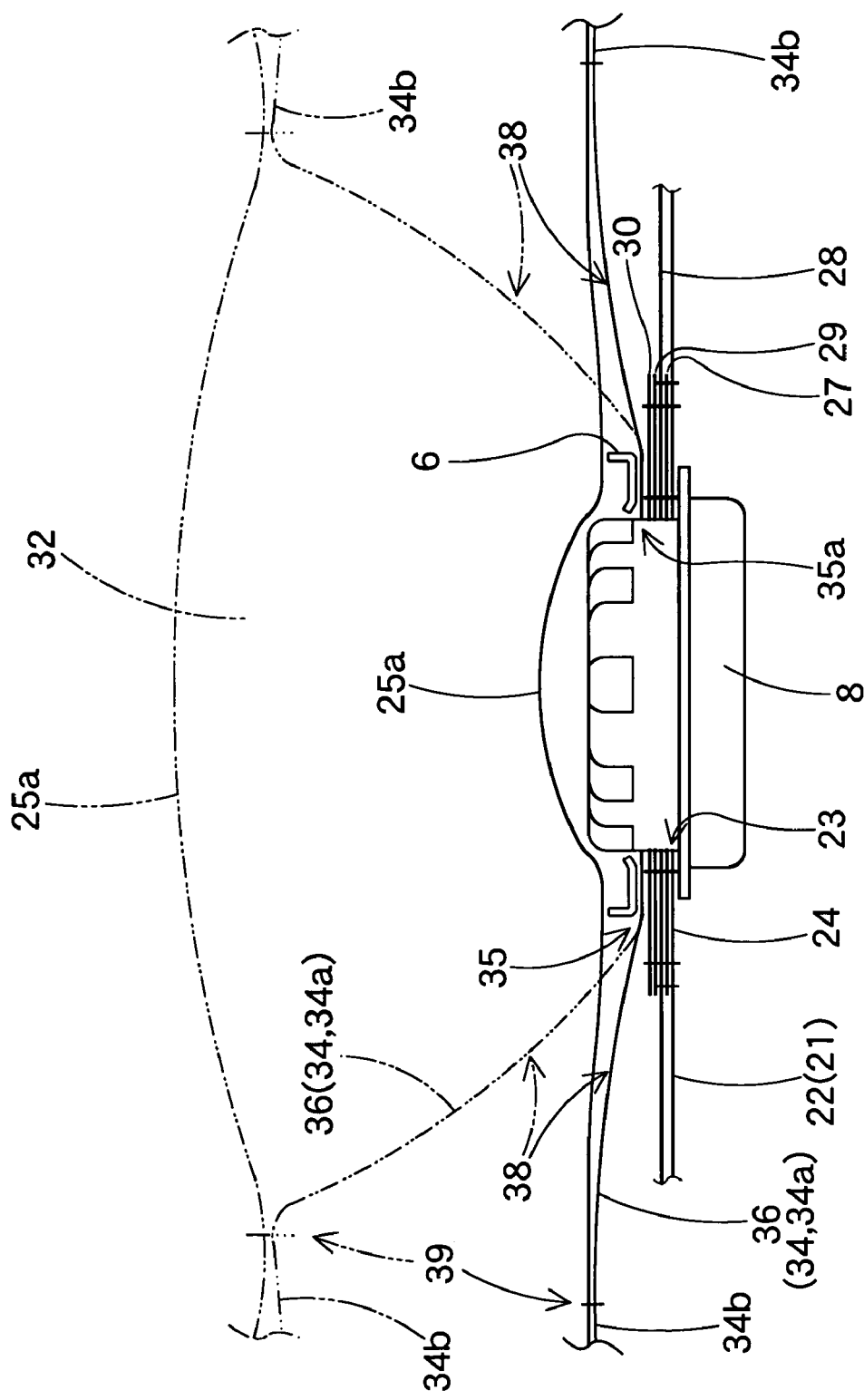
FIG. 7 is a schematic partial longitudinal sectional view taken along a left/right direction showing a state of an auxiliary inflation portion in an initial stage of operation of the air bag of the embodiment.
Figure 8:
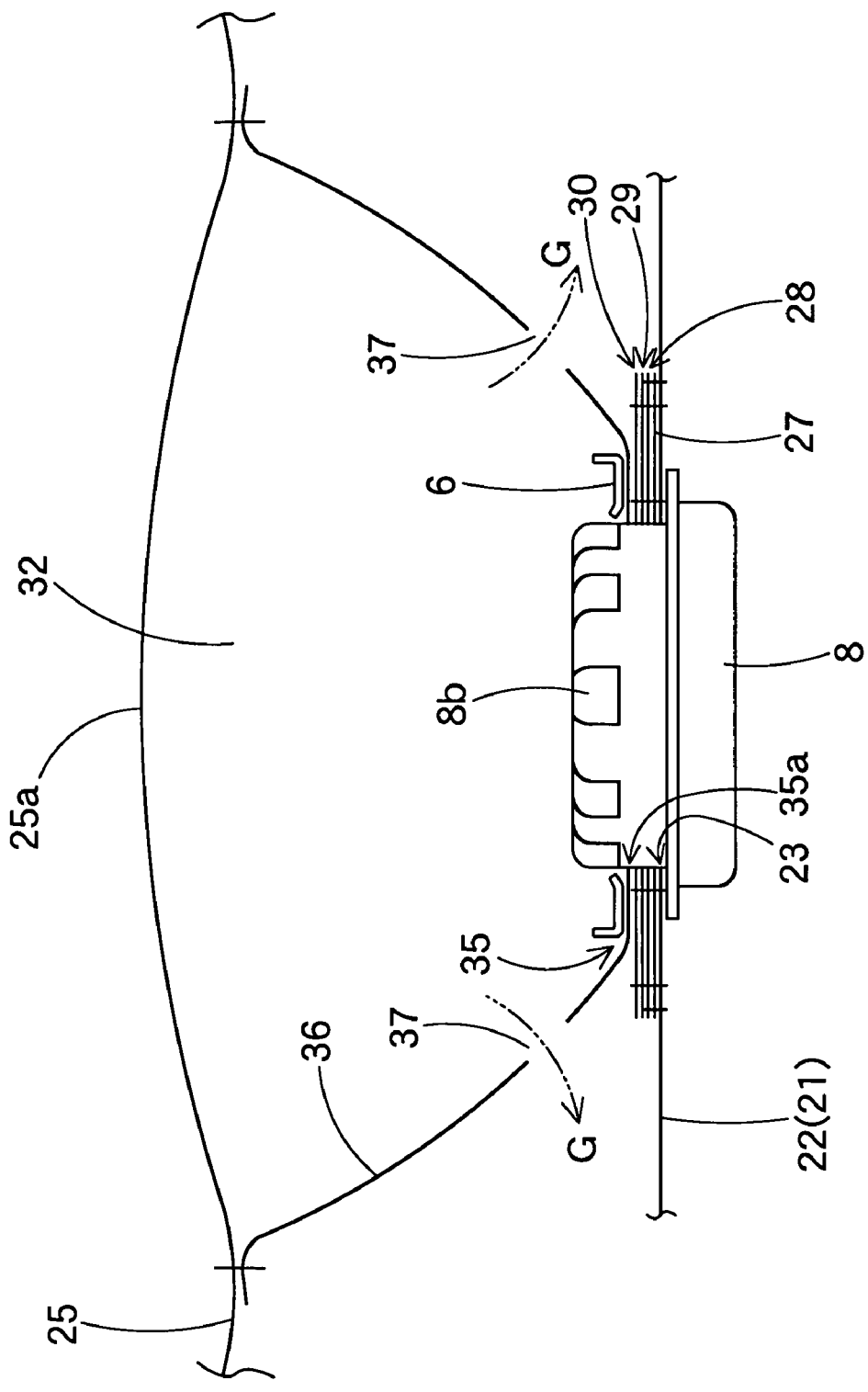
FIG. 8 is a schematic partial longitudinal sectional view taken along a front/rear direction showing a state of the auxiliary inflation portion in an initial stage of operation of the air bag of the embodiment and shows a state following the state in FIG. 7.

A portion of the flat plate portion 34a between the wheel side connection portion 35 and the driver side connection portion 39 provides a tubular peripheral wall 36 for configuring an outer peripheral wall of the auxiliary inflation portion 32 upon airbag deployment. The auxiliary inflation portion 32 completes its inflation before the completion of inflation of the air bag body 21. As shown in FIGS. 7 and 8, the peripheral wall 36 rises and inflates from the ring shaped wheel side connection portion 35 of the periphery 24 of the opening 23 in a downward tapered tube shape. A plurality (two, in the illustrated embodiment) of gas outflow ports 37 for allowing the inflation gas G ejected from the inflator 8 to flow out into the air bag body 21 are formed in this peripheral wall 36. The gas outflow ports 37, each opening along the periphery of the opening 35a, in a folding-fan shape such as formed by curving a rectangle, are formed in two places, front and rear, of the peripheral wall 36. A total opening area of the gas outflow ports 37 is predetermined such that the auxiliary inflation portion 32 can once reserve the inflation gas therein. The inflation of the auxiliary inflation portion 32 enables the air bag 20 to secure an internal pressure capable of exhibiting a cushioning action even at a low temperature.

Figure 3:
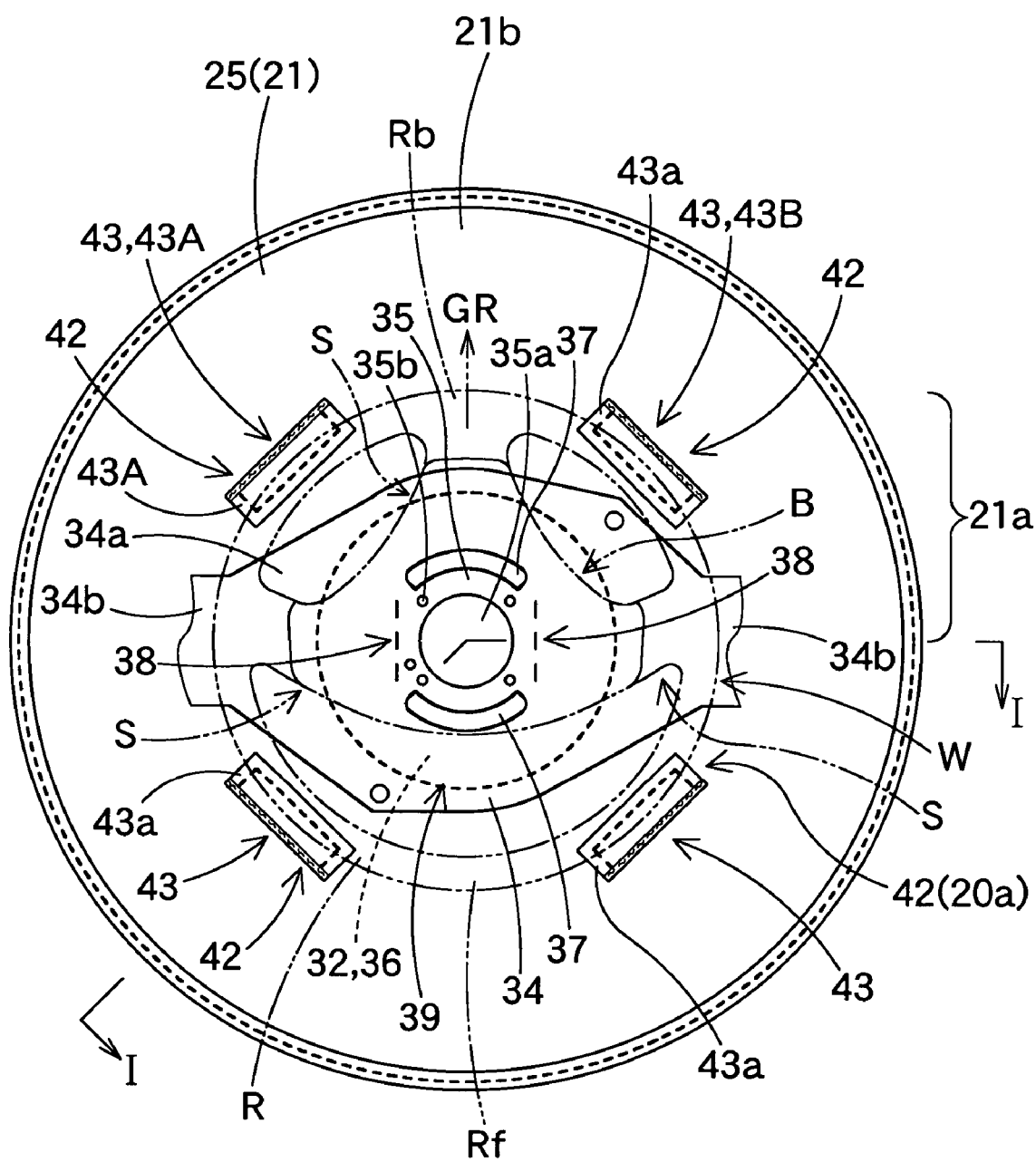
FIG. 3 is a schematic transverse sectional view of the air bag of the embodiment, which corresponds to a section taken along line III—III of FIG. 1.

Besides, the peripheral wall 36 has a plurality (two, in the foregoing embodiment) of breakable portions 38 formed between the wheel side connection portion 35 and the driver side connection portion 39. The breakable portions 38 are broken between the wheel side connection portion 35 and the driver side connection portion 39, as shown in FIG. 3, so as to release the inflation of the auxiliary inflation portion 32 when the internal pressure of the air bag body 21 reaches a predetermined pressure (on the order of 10 to 20 KPa). In the foregoing embodiment, the breakable portions 38 are formed by perforation cuts between the gas outflow ports 37. These breakable portions 38 are disposed in straight lines extending along a front/rear direction so as to provide a connection between left and right edges of the front and rear gas outflow ports 37, respectively. Before the breakable portions 38 are broken, the peripheral wall 36 regulates a separation distance from the opening 23 to an opposite area 25a of the driver side wall 25.

As aforesaid, the thickness regulating tethers 41 are formed of the belt-like portions 34b on both the left and right sides of the inflation portion fabric material 34 and the extension portions 28a on both the left and right sides of the reinforcing fabric 28. That is, the tethers 41 are disposed in the vicinity of the opening 23 with the corresponding leading end portions 34c, 28b sewn together. The tethers 41 regulate a completely inflated shape of the air bag body 21, thus regulating the separation distance between the opposite area 25a of the driver sidewall 25 and the opening 23. The separation distance L1 from the opening 23 to the opposite area 25a which is regulated by the tether 41 is longer than that regulated by the peripheral wall 36.

Each of the oscillation regulating tethers 43 is formed, in a belt shape, of a woven fabric similar to that of the walls 22, 25 and is disposed at a position of the completely inflated air bag 20 in the vicinity of the ring R of the steering wheel W, thus regulating a separation distance between the driver side wall 25 and the wheel side wall 22. The tether 43 has its upper and lower ends 43a, 43b sewn to the walls 25, 22, respectively. In the foregoing embodiment, four oscillation regulating tethers 43 are radially arranged about the opening 23 with even spaces between one another. Furthermore, in the foregoing embodiment, two tethers 43A, 43B on the rear side are separated from each other to the left and right sides, so as to be able to secure a flow path GR of the inflation gas G directed from the opening 23 of the completely inflated air bag 20 to an airbag rear end 21b part on the vehicle rear side.

Consequently, a space between the tethers 43A, 43B provides a gap (opening) 45 for securing the flow path GR.

Besides, the length of each tether 43 is predetermined shorter than the separation distance L1 between the driver side wall 25 and the wheel side wall 22 which is regulated by the thickness regulating tether 41, so as to define a separation distance L2 between the driver side wall 25 and the wheel side wall 22. Needless to say, the length of the tether 43 is set to a length capable of securing the cushioning action of the air bag 20. Incidentally, in the foregoing embodiment, L2 is set to a distance on the order of one half of L1.

A description will now be given of the manufacture of the air bag 20. The opening 35a, the attachment holes 35b, the gas outflow ports 37, and the breakable portions 38 are pre-formed in the inflation portion fabric material 34 forming the auxiliary inflation portion 32. Firstly, the inflation portion fabric material 34 is sewn to the driver side wall 25 at a position of the driver side connection portion 39. Next, the reinforcing fabrics 27, 28, 29, 30 are sewn to the wheel side wall 22. Thereafter, the attachment holes 24a and the opening 23 are bored in the wheel sidewall 22 and the reinforcing fabrics 27, 28, 29, 30. The slits of the vent holes 22a may be pre-formed or may be formed at the same time during the boring process.

Thereafter, one end 43a or 43b of each of the oscillation regulating tethers 43 is sewn to one of the walls 22, 25.

At this time, the individual tethers 43 are set so as to be disposed in the ring R vicinity of the completely inflated air bag 20. That is, as shown in FIGS. 2 and 3, places 42 for connection of the oscillation regulating tethers 43 to the driver side wall 24 and the wheel side wall 22 are set so as to be disposed outward from the position for disposition of the ring R of the steering wheel W as viewed in plan. Positions of the connection places 42 at this time are based on a state in which the driver side wall 25 and the wheel side wall 22 are superposed one on the other and flatly developed. Furthermore, positions of these walls 25, 22 are based on the plan view of a state in which the attachment area of the opening periphery 24 is aligned with an attachment position of the steering wheel W.

Besides, with the sewing of the one end 43a or 43b of the tether 43, the walls 22, 25 are superposed one on the other with the outer surface sides opposed to each other, and the outer peripheries of the walls 22, 25 are sewn together. After the sewing of the outer peripheries, the air bag body 21 is inverted utilizing the opening 23 so that the seam allowances of the outer peripheries are not exposed to the outer surface of the air bag 20. After the inversion, the other end 43b or 43a of the tether 43 is sewn to the corresponding wall 25 or 22. Besides, the leading end portions 28b, 34c corresponding to the extension portion 28a of the reinforcing fabric 28 and to the belt-like portion 34b of the fabric material 34 are drawn out from the opening 23 and sewn together, thus forming the tethers 41. As a result, the air bag 20 can be manufactured.

Additionally, when much labor is required for the operation of sewing of the other end 43b or 43a of the tether 43, the configuration may be as shown in parentheses in FIG. 4. That is, each of the tethers 43 is formed of two longitudinally halved fabric materials 44. Individual end 43a, 43b of the materials 44 are sewn to the walls 22, 25, respectively. Thereafter, similar to the tethers 41, after the inversion of the air bag body 21 after the outer peripheries of the walls 22, 25 are sewn together, leading end portions 44a of the halved fabric materials 44 are drawn out from the opening 23 and sewn together. The tether 43 is formed by this sewing.

To assemble the air bag device M, first, before the air bag 20 is folded, the retainer 6 is inserted into the air bag 20 from the openings 23, 35a and disposed between the driver side wall 25 and the inflation portion fabric material 34. Thereafter, the air bag 20 is folded with the bolts 6a projecting from the attachment holes 35b, 24a. Subsequently, after the air bag 20 is wrapped with a wrapping material for preventing unfolding, the bolts 6a of the retainer 6 projecting from the air bag 20 are inserted through the attachment holes 11b of the bag holder 10. Thus, the air bag 20 is mounted on the bottom wall 11 of the bag holder 10. Additionally, at this time, the attachment bracket 14 is connected to the bag holder 10 via the horn switch systems 13. And, the air bag 20 is covered with the pad 17, and the side wall 17b is riveted to the side wall 12 of the bag holder 10.

Thereafter, the main body 8a of the inflator 8 is inserted into the insertion hole 11a of the bag holder 10 and the openings 23, 35a from below, and the bolts 6a of the retainer 6 are projected downwardly from the through holes 8d formed in the flange 8c of the inflator 8. Then, once the nuts 7 are screwed on the bolts 6a, the air bag 20, the bag holder 10, the attachment bracket 14, and the inflator 8 are integrally assembled, thus completing the assembly of the air bag device M.

Subsequently, with the metal core 2 of the boss B of the steering wheel body 1 being fastened to the steering shaft SS of the vehicle, the attachment seats 14a of the attachment bracket 14 are bolted by bolts 15 to the metal core 2, thereby enabling attachment of the air bag device M to the steering wheel W.

Thereafter, when the inflation gas is ejected from the gas ejection ports 8b of the inflator main body 8b in the course of driving, a predetermined position of the cover body 17a of the pad 17 is broken to inflate the folded air bag 20 to a large volume.

Figure 9A:
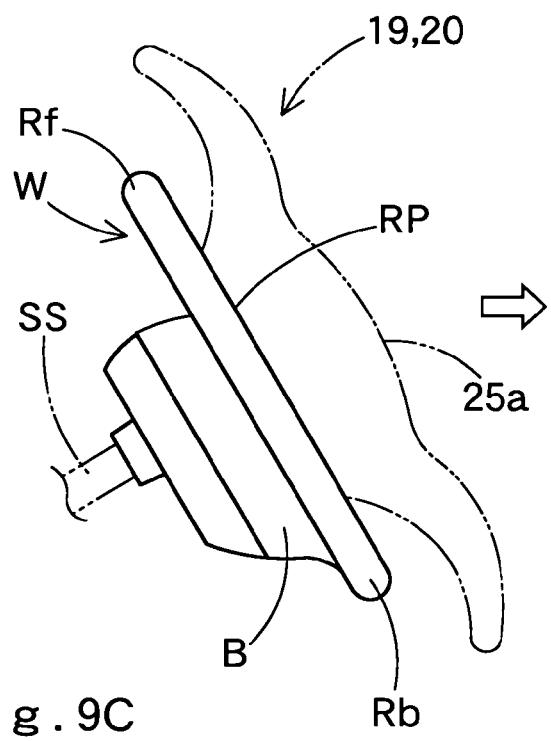
FIGS. 9A and 9C are side views showing an inflated state of the air bag of the embodiment.

In this initial state of operation of the air bag device M, as shown in FIGS. 7, 8, and 9A, the inflation gas G ejected from the gas ejection ports 8b of the inflator main body 8a once fills the auxiliary inflation portion 32 surrounded by the wheel side connection portion 35, the peripheral wall 36, and the driver side wall 25, thus inflating the auxiliary inflation portion 32. Then, the inflation gas G flows into the air bag body 21 from the gas outflow ports 37 while being controlled in a flow direction to be directed toward both sides in a front/rear direction.

When the inflation gas G flows into the air bag body 21 and the internal pressure of the air bag body 21 reaches the predetermined pressure, a predetermined or greater tension is generated in an area of the peripheral wall 36 between the driver side connection portion 39 and the wheel side connection portion 35. Consequently, the breakable portions 38 are broken to release the connection between the driver side wall 25 and the vicinity of the opening 23. As a result, the inflation gas G from the gas ejection ports 8b of the main body 8a of the inflator 8 flows radially about the opening 23 without the flow being restricted, thus inflating the air bag body 21.

During this inflation, the air bag body 21 inflates while being regulated by the tethers 41, 43 so that the respective separation distances between the driver side wall 25 and the wheel side wall 22 reaches L1 and L2.

When the air bag 20 (air bag body 21) is developed from the folded state by the inflation gas G, the oscillation regulating tethers 43 regulate the air bag 20 so that the separation distance L2 between the driver side wall 25 and the wheel side wall 22 is shorter than the separation distance L1 regulated by the thickness regulating tether 41, in the steering wheel W ring R vicinity of the completely inflated air bag 20.

Figure 9B:
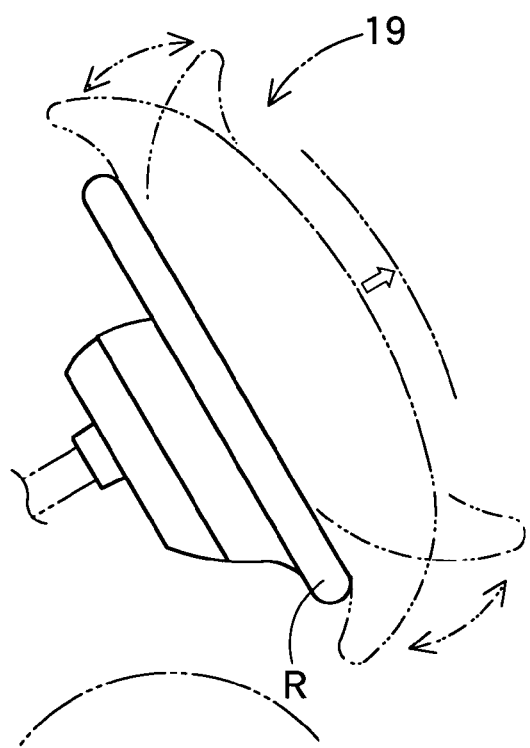
FIG. 9B is a side view showing an inflated state of a conventional air bag.
Figure 9C:
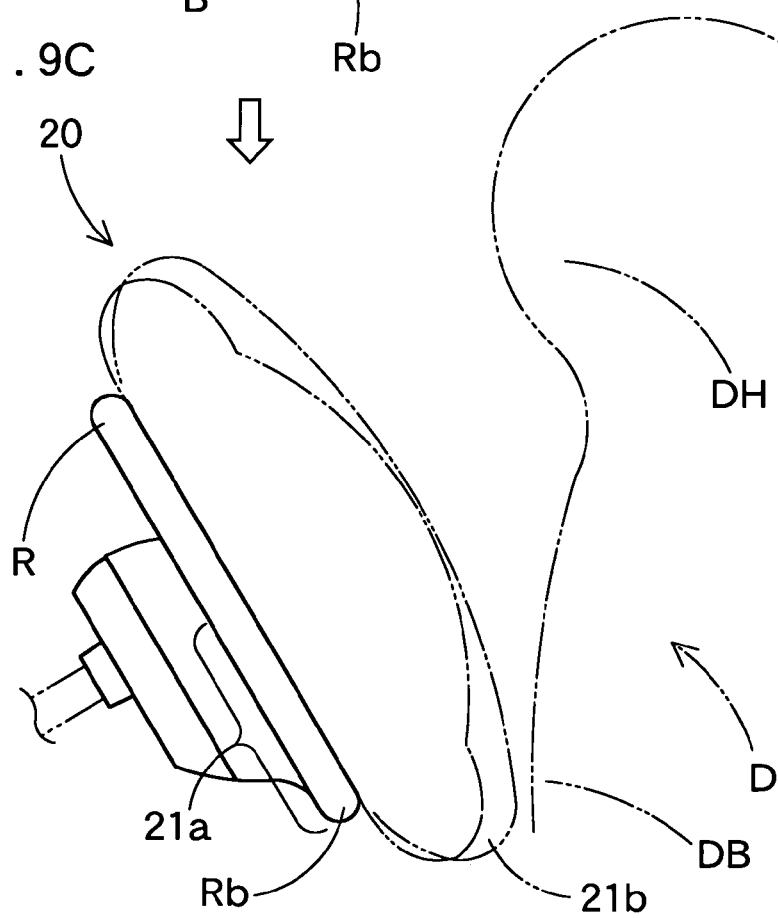

That is, as shown in FIG. 9B, large oscillations in the vicinity of the outer periphery of a conventional air bag 19 occur as an area of the air bag 19 in the vicinity of the ring R repeatedly increases and decreases in thickness. The decrease in thickness occurs as a reaction after the thickness is increased, and the increased thickness becomes on the order of the thickness of the thickest area of the completely inflated air bag 19 or more.

However, in the foregoing embodiment, the ring R vicinity of the air bag 20 is regulated by the oscillation regulating tethers 43 so that the separation distance L2 between the driver side wall 25 and the wheel side wall 22 is shorter than the separation distance L1 therebetween regulated by the thickness regulating tether 41. Consequently, up and down oscillations in the course of inflation are restrained, so that it becomes difficult for the ring R vicinity of the air bag 20 to separate from the ring R (see FIGS. 1 and 9C). Starting from the initial stage of inflation, it becomes easy for the ring R vicinity of the air bag 20 to secure a shape of the air bag 20 as completely inflated, i.e., a shape thereof that covers the ring R while contacting the ring R. Consequently, even when the driver D moves forward in the course of inflation, the air bag 20 prevents the driver D from directly contacting the ring R.

Accordingly, in the air bag 20 for steering wheel of the foregoing embodiment, the oscillation in the course of inflation is restrained, thus stabilizing of the driver D holding performance of the air bag 20.

Figure 1:
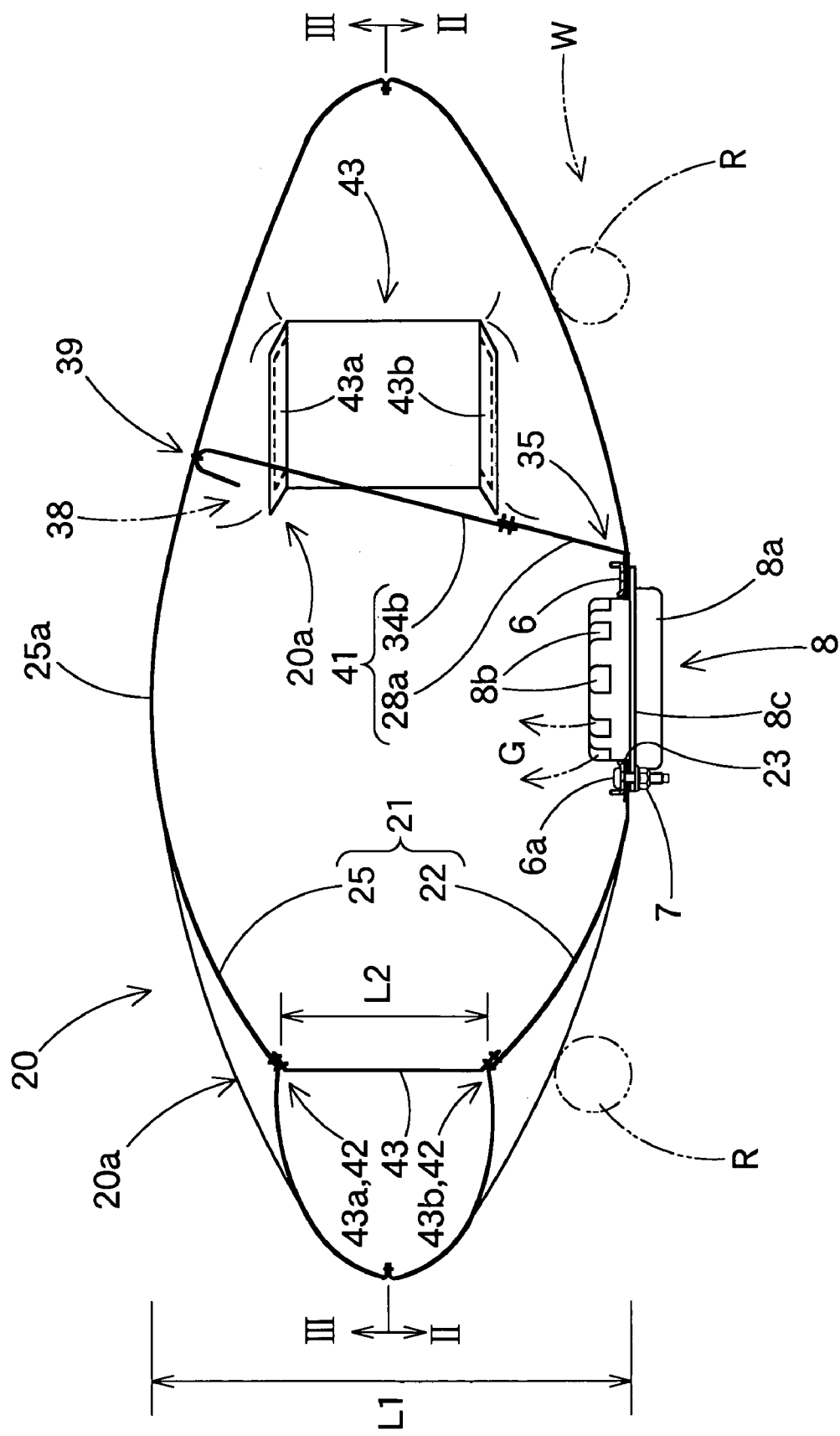
FIG. 1 is a schematic longitudinal sectional view showing a completely inflated state of an air bag, as a simple body, according to an embodiment of the invention, which corresponds to a section taken along line I—I of FIGS. 2 and 3.

Besides, in the air bag 20, as shown in FIGS. 2 and 3, the places 42 for connection of the oscillation regulating tethers 43 to the driver side wall 25 and the wheel side wall 25 which are superposed on each other and flatly developed are disposed outward from the position for disposition of the ring R of the steering wheel W as viewed in plan when the attachment area of the opening periphery 24 of the air bag 20 is aligned with the position for attachment thereof to the steering wheel W. Consequently, as shown in FIG. 1, when the driver side wall 25 and the wheel side wall 22 are inflated to separate one from the other during inflation of the air bag 20, the places 42 for connection of the oscillation regulating tether 43 to the walls 25, 22 reliably come closer to the opening 23, i.e., to the ring R than in the state where the walls 25, 22 are flat. As a result, the places 42 for connection of the oscillation regulating tether 43 to the driver side wall 25 and the wheel side wall 22 are reliably disposed in the vicinity of the ring R upon completion of inflation of the air bag 20.

Besides, in the air bag 20 of the embodiment, the oscillation regulating tethers 43 are so disposed to secure the flow path GR of the inflation gas G that is directed from the opening 23 toward the rear end 21b part of the air bag 20 upon completion of inflation. Consequently, when the air bag 20 inflates during straight-ahead steering, the rear end part 21b of the airbag, i.e., an area 21b for protecting an abdomen DB of the driver D from a rear part Rb of the ring R can quickly inflate by allowing the inflation gas G to flow thereinto. As a result, even when the driver D moves forward in the course of inflation, the air bag 20 can protect the abdomen DB of the driver D with satisfactory cushioning properties.

Furthermore, in the foregoing embodiment, there are disposed four oscillation regulating tethers 43, and the individual tethers 43 are evenly spaced radially about the opening 23. Consequently, the entire air bag 20 stably inflates while restraining oscillations starting from the initial stage of inflation. As a result, even when the air bag 20 happens to inflate in the course of steering of the steering wheel W, the air bag 20 can improve the driver D holding performance irrespective of steering angle of the steering wheel W. The number of tethers 43 need only be three or more when a plurality of the tethers 43 are evenly spaced radially about the opening 23.

Figure 10:
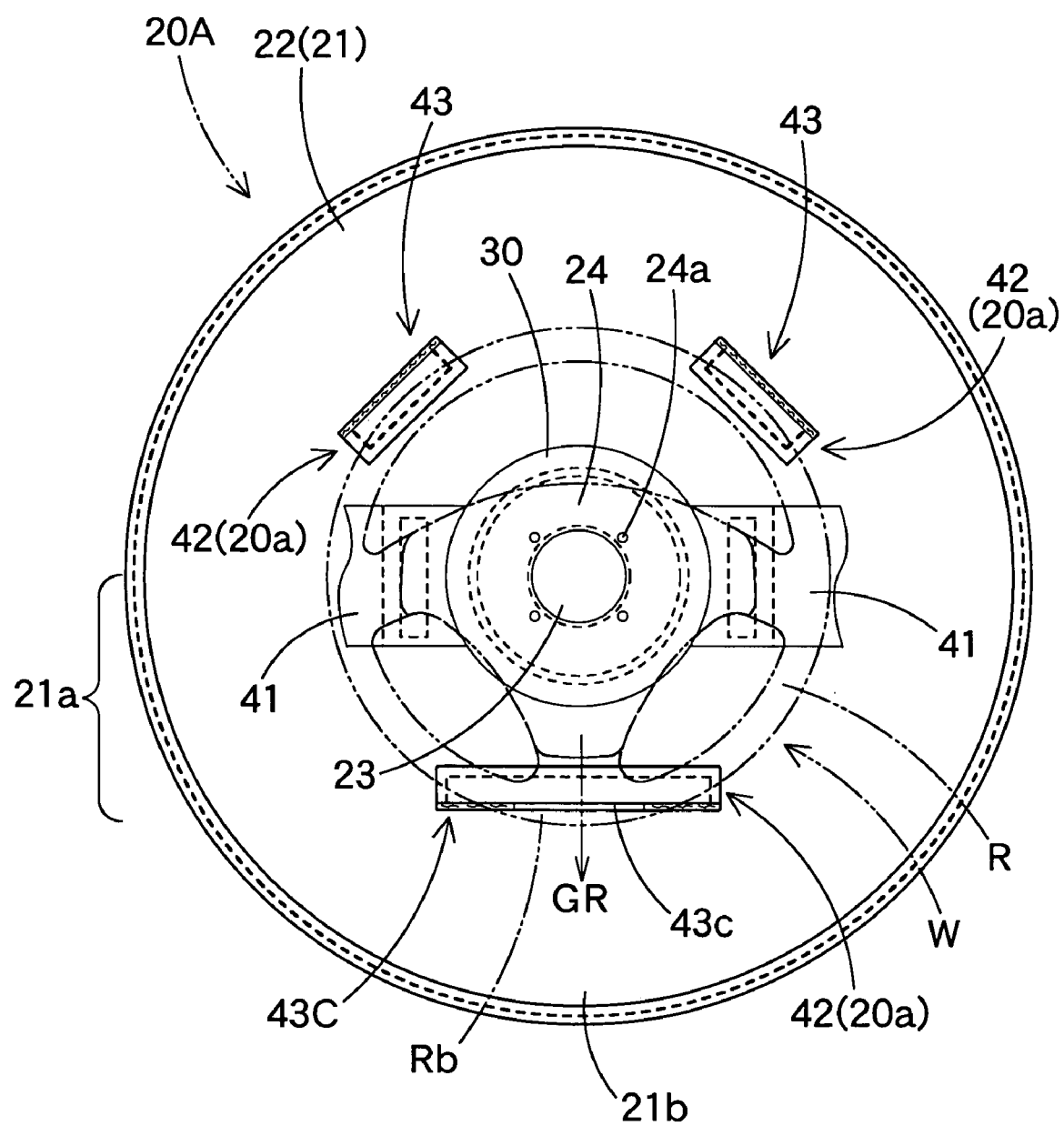
FIG. 10 is a view showing an air bag of a modified example of the embodiment.
Figure 11:
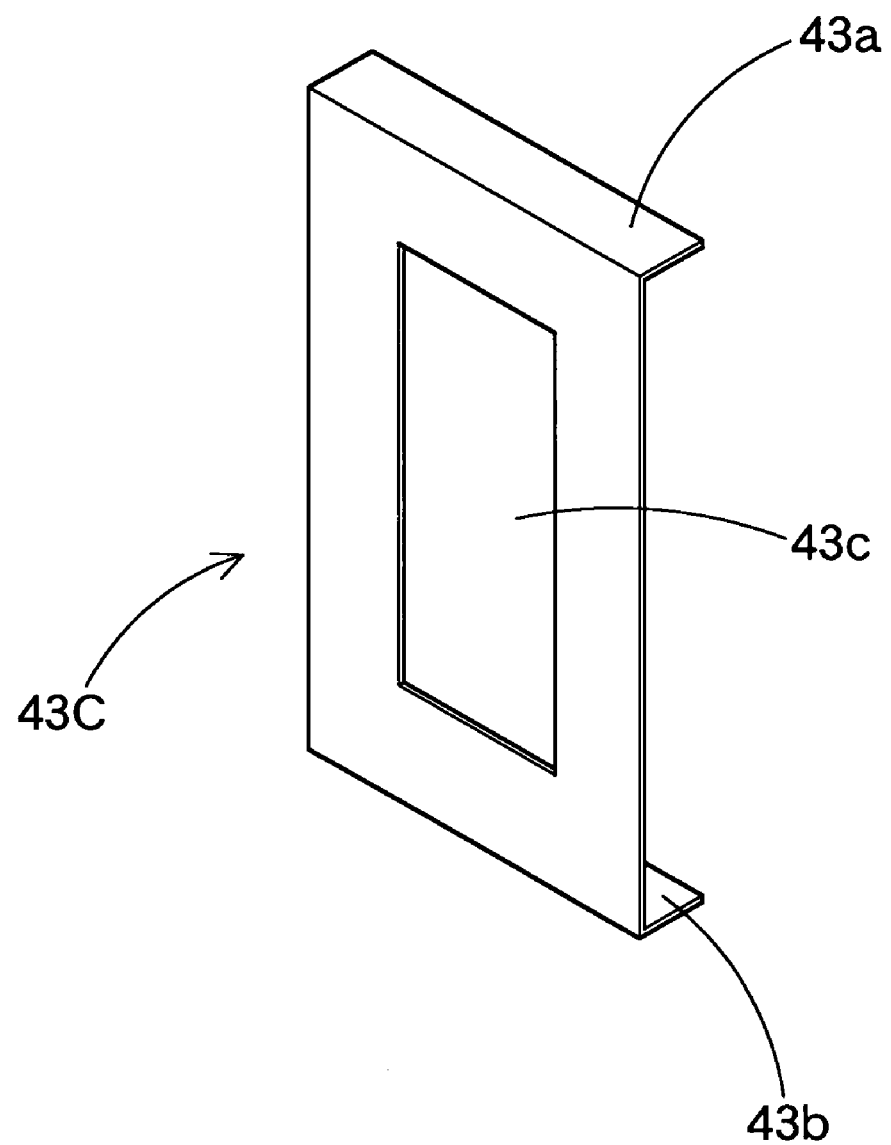
FIG. 11 is a perspective view of an oscillation regulating tether used in the air bag of FIG. 10.

Additionally, when the aforesaid point is not taken into account, as in an air bag 20A shown in FIG. 10, one oscillation regulating tether 43C (see FIG. 11) may be disposed in a rear side area 21a. This tether 43C includes a large opening 43c so as to secure the flow path GR of the inflation gas to the rear end 21b.

Figure 12:
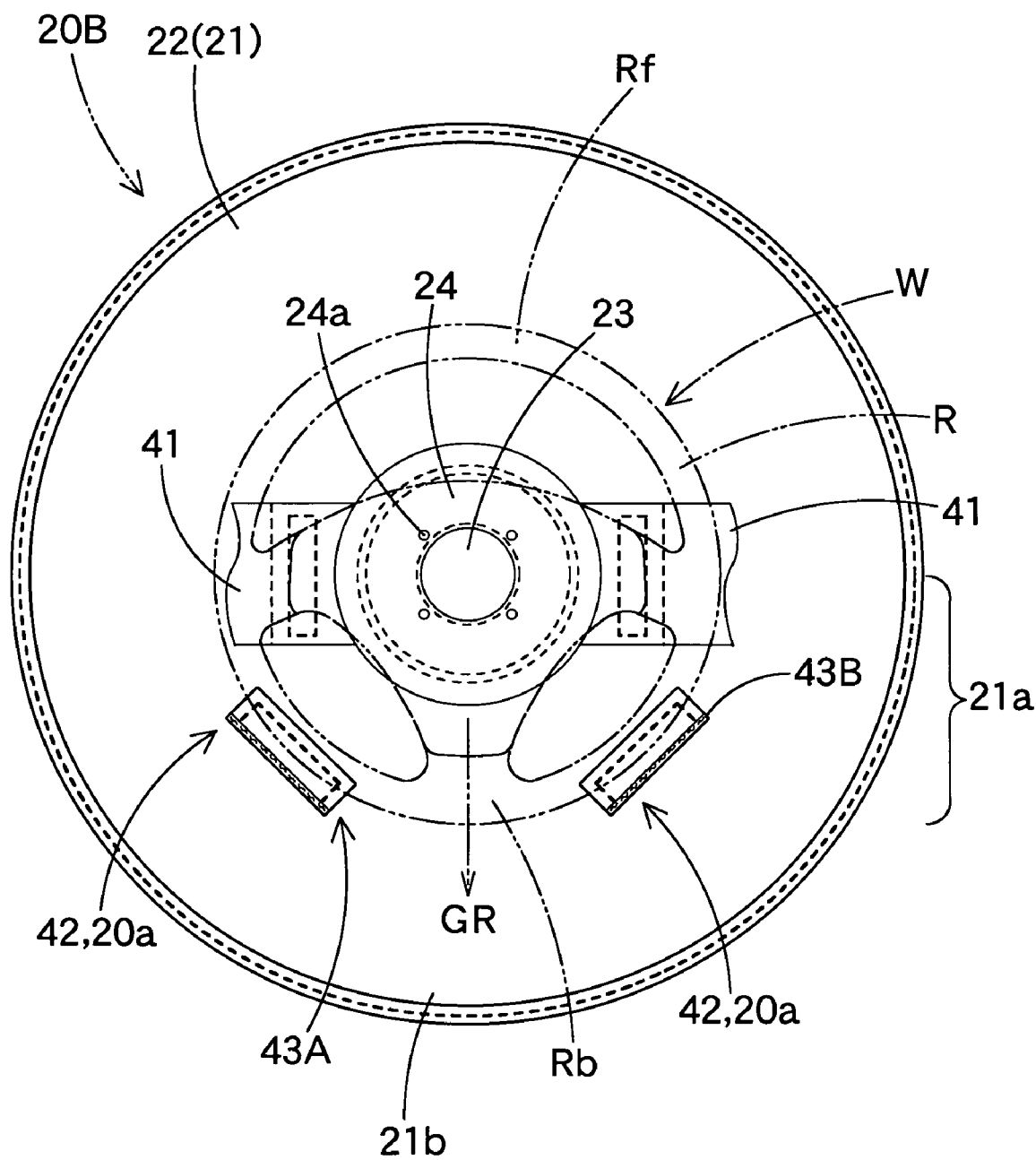
FIG. 12 is a view showing an air bag of another modified example of the embodiment.
Figure 13:
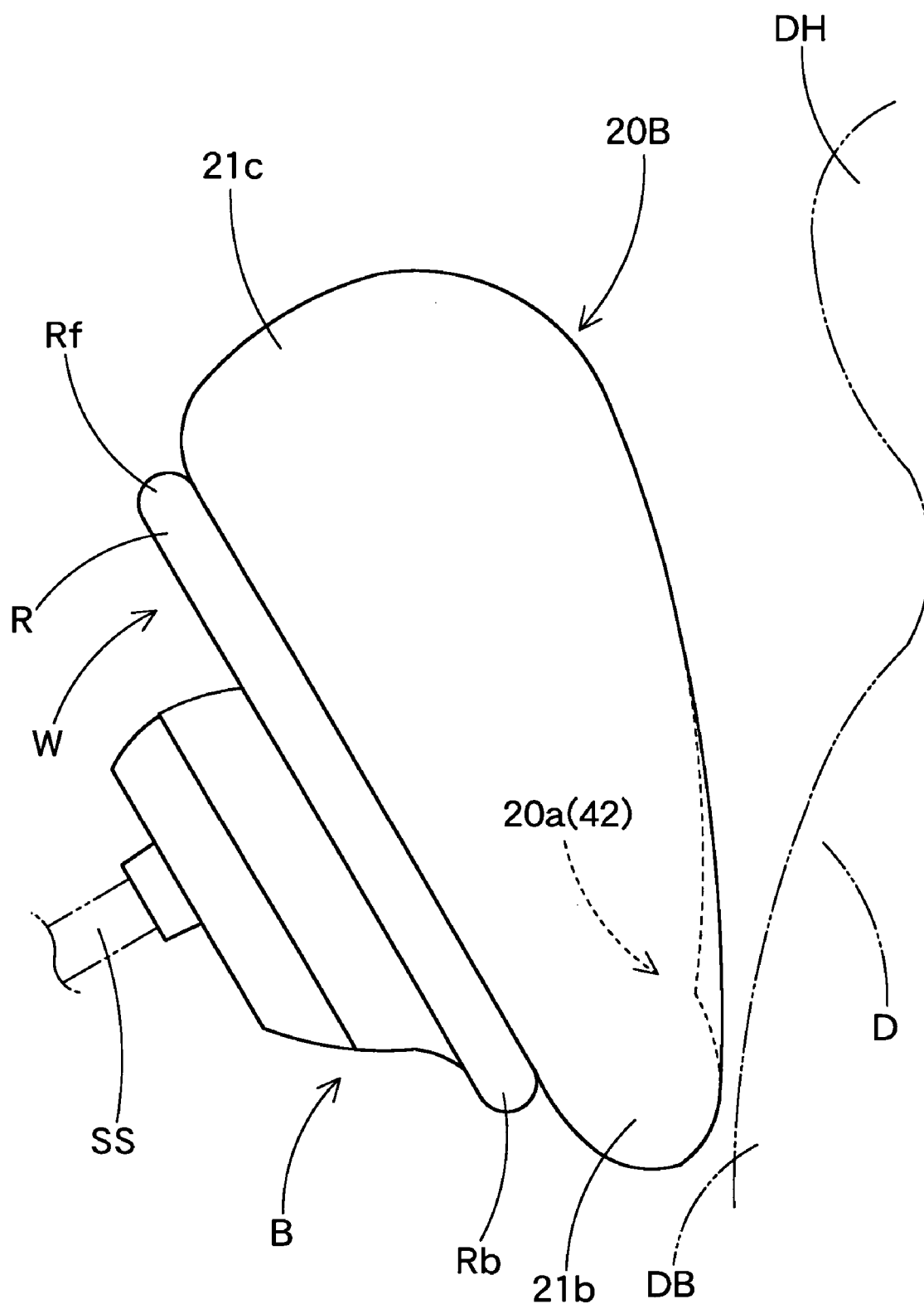
FIG. 13 is a side view showing a completely inflated state of the air bag shown in FIG. 12.

Besides, upon completion of inflation, the oscillation regulating tethers 43 may be disposed in front and rear areas of the ring R. Alternatively, as in an air bag 20B shown in FIGS. 12 and 13, the tether 43 may be disposed in the area 21a only on the rear Rb side of the ring R.

In such a case, an area 21a of the air bag 20B which is positioned on the rear Rb side of the ring R is arranged to stably cover the ring R, starting from the initial stage, by the oscillation regulating tether 43. Consequently, the rear end 21b of the air bag 20B can be quickly and stably disposed on the rear Rb side of the ring R which is close to the abdomen DB of the driver D. Conversely, an area 21c of the air bag 20B on a front Rf side of the ring R covers the front Rf side of the ring R in a thick state. That is, the area 21c on the front side can protect a head DH of the driver D with satisfactory cushioning properties. Additionally, the area 21c of the air bag 20B on the front Rf side of the ring R, since not having the oscillation regulating tether 43 disposed therein, may oscillate in the initial stage of inflation. However, this area 21c is an area for holding the head DH vicinity of the driver D. Because a plane RP of the ring R of the steering wheel W is inclined from the horizontal, the area 21c is separated from the driver D as compared with the rear end 21b side of the air bag 20B for holding the abdomen DB of the driver D. As a result, the area 21c can hold the head DH vicinity of the driver D in unoscillated condition. Consequently, even though the oscillation regulating tether 43 is not disposed in the area 21c of the air bag 20B on the front Rf side of the ring R, the air bag 20B has no difficulties in protecting the driver D.

Besides, in the air bag 20 of the foregoing embodiment, the separation distance L2 between the driver side wall 25 and the wheel side wall 22 which is regulated by the oscillation regulating tether 43 is set to about one half of the separation distance L1 between the walls 25, 22 which is regulated by the thickness regulating tether 41. However, when the separation distance L2 in the area 20a of the completely inflated air bag 20 in the vicinity of the ring R is stable, the oscillations in the course of inflation can be restrained. Consequently, within a range in which the air bag 20 can secure the cushioning action, the separation distance L2 between the walls 25, 22 which is regulated by the oscillation regulating tether 43 needs only to be shorter than the separation distance L1 therebetween regulated by the thickness regulating tether 41.

However, the separation distance L2 of the tether 43 need to be shorter than a dimension between the walls 25, 22 in the area 20a in the vicinity of the ring R which is only regulated by the thickness regulating tether 41. The reason is that when the tether 43 is longer, the tether 43 goes slack upon completion of inflation of the air bag 20. The material of the tether is wasted. Consequently, the separation distance L2 is preferably made shorter than the dimension between the walls 25, 22 in the area 20a in the vicinity of the ring R which is only regulated by the thickness regulating tether 41. Needless to say, when the thickness of the area 20a of the air bag 20 in the vicinity of the ring R becomes excessively thin, the cushioning action cannot be obtained. Consequently, the separation distance L2 between the driver side wall 25 and the wheel side wall 22 which distance is regulated by the oscillation regulating tether 43 preferably secures 50 mm or more. That is, a range of $L1 > L2 \geq 50$ mm, or more preferably, $L1 \times 2/3 \geq L2 \geq 50$ mm is preferred. Additionally, the separation distance L1 is normally 150 to 350 mm, and since a preferred range of L1 is 180 to 300 mm, a range of $L1 \times 2/3 = 100$ to $235 \geq L2 \geq 50$ mm, or more preferably, $L1 \times 2/3 = 120$ to $200 \geq L2 \geq 50$ mm is preferred.

Besides, in the air bag 20, in the initial stage of inflation, the auxiliary inflation portion 32 completes inflation while allowing part of the inflation gas G to flow out from the gas outflow ports 37 to the air bag body 21 side. At this time, the opening area of the gas outflow ports 37 is not excessively large, and the flow rate of the inflation gas G flowing out to the airbag body 21 side is small. Consequently, even when the inflation gas G flowing in is small in volume at a low temperature, the auxiliary inflation portion 32 can increase its internal pressure and inflate so that the cushioning action can be secured, thus protecting the head H, etc. of the driver D.

What is claimed is:

1. An air bag for a steering wheel that is folded and housed in a boss positioned in the vicinity of the center of a ring of the steering wheel which ring is gripped by a driver during steering, the air bag comprising:
    a driver side wall that is disposed on a driver side of the completely inflated air bag;
    a wheel side wall that has substantially the same outer shape as the driver side wall and is disposed on a steering wheel side of the completely inflated air bag;
    an opening that is disposed in the vicinity of the center of the wheel side wall and used for supplying an inflation gas therethrough, a periphery of the opening providing an area for attachment of the air bag to the steering wheel;
    a thickness regulating tether disposed in the vicinity of the opening for regulating a separation distance between the driver side wall and the wheel side wall of the completely inflated air bag and thus regulating a thickness of the completely inflated air bag; and
    an oscillation regulating tether disposed in the vicinity of the ring of the steering wheel as the airbag is completely inflated, for regulating a separation distance between the driver side wall and the wheel side wall, wherein:
    the separation distance between the driver side wall and the wheel side wall regulated by the oscillation regulating tether is set to a length capable of securing a cushioning action of the air bag, and is shorter than the separation distance between the driver side wall and the wheel side wall regulated by the thickness regulating tether;
    the oscillation regulating tether is connected to the driver side wall and the wheel side wall in such a manner as to extend perpendicularly to a plane defined by the ring of the steering wheel when the airbag is completely inflated; and
    the oscillation regulating tether is disposed only in an area on the rear side of the ring closer to an abdomen of the driver in the completely inflated air bag.

2. An air bag for a steering wheel that is folded and housed in a boss positioned in the vicinity of the center of a ring of the steering wheel which ring is gripped by a driver during steering, the air bag comprising:
- a driver side wall that is disposed on a driver side of the completely inflated air bag;
- a wheel side wall that has substantially the same outer shape as the driver side wall and is disposed on a steering wheel side of the completely inflated air bag;
- an opening that is disposed in the vicinity of the center of the wheel side wall and used for supplying an inflation gas therethrough. a periphery of the opening providing an area for attachment of the air bag to the steering wheel;
- a thickness regulating tether disposed in the vicinity of the opening for regulating a separation distance between the driver side wall and the wheel side wall of the completely inflated air bag and thus regulating a thickness of the completely inflated air bag; and
- an oscillation regulating tether disposed in the vicinity of the ring of the steering wheel as the airbag is completely inflated, for regulating a separation distance between the driver side wall and the wheel side wall, wherein:
- the separation distance between the driver side wall and the wheel side wall regulated by the oscillation regulating tether is set to a length capable of securing a cushioning action of the air bag, and is shorter than the separation distance between the driver side wall and the wheel side wall regulated by the thickness regulating tether;
- the oscillation regulating tether is connected to the driver side wall and the wheel side wall in such a manner as to extend perpendicularly to a plane defined by the ring of the steering wheel when the airbag is completely inflated; and
- places for connection of the oscillation regulating tether to the driver side wall and the wheel side wall are disposed, in a condition that the driver side wall and the wheel side wall are superimposed one on the other and flatly developed, along a position for disposition of the ring of the steering wheel as viewed in plan when the attachment area of the opening periphery of the air bag is aligned with a position for attachment thereof in the steering wheel.

3. An air bag for a steering wheel according to claim 2, wherein a plurality of the oscillation regulating tethers are disposed and the individual oscillation regulating tethers are radially arranged about the opening of the airbag with even spaces between one another.

4. An air bag for a steering wheel according to claim 2, wherein the oscillation regulating tether is disposed so as to secure a flow path of the inflation gas that is directed from the opening toward a rear end of the air bag as completely inflated.

5. An air bag for a steering wheel according to claim 4, wherein the flow path of the inflation gas is secured by a gap between two of the oscillation regulating tethers disposed apart one from the other.

6. An air bag for a steering wheel according to claim 4, wherein the flow path of the inflation gas is secured by an opening provided in the oscillation regulating tether itself.

7. An air bag for a steering wheel according to claim 2, wherein:
- the separation distance between the driver side wall and the wheel side wall regulated by the thickness regulating tether is indicated by $L1$, and the separation distance between the driver side wall and the wheel side wall regulated by the oscillation regulating tether is indicated by $L2$, $L1 > L2 \geq 50$ mm; and
- the minimum length capable of securing a cushioning action of the airbag is 50 mm.

8. An air bag for a steering wheel according to claim 7, wherein $L1 \times 2/3 \geq L2 \geq 50$ mm.

9. An air bag for a steering wheel according to claim 8, wherein $L1 \times 2/3 = 100$ to $235 \geq L2 \geq 50$ mm.

10. An air bag for a steering wheel according to claim 9, wherein $L1 \times 2/3 = 120$ to $200 \geq L2 \geq 50$ mm.

* * * * *